(12) United States Patent
Frascadore

(10) Patent No.: US 9,098,318 B2
(45) Date of Patent: Aug. 4, 2015

(54) COMPUTATIONAL ASSET IDENTIFICATION WITHOUT PREDETERMINED IDENTIFIERS

(75) Inventor: Gregory Frascadore, Colorado Springs, CO (US)

(73) Assignee: VMware, Inc., Palo Alto, CA (US)

( * ) Notice: Subject to any disclaimer, the term of this patent is extended or adjusted under 35 U.S.C. 154(b) by 619 days.

(21) Appl. No.: 13/294,813

(22) Filed: Nov. 11, 2011

(65) Prior Publication Data

US 2013/0125114 A1    May 16, 2013

(51) Int. Cl.
*G06F 9/455* (2006.01)
*G06F 21/30* (2013.01)

(52) U.S. Cl.
CPC ............... *G06F 9/455* (2013.01); *G06F 21/30* (2013.01)

(58) Field of Classification Search
None
See application file for complete search history.

(56) References Cited

U.S. PATENT DOCUMENTS

2008/0250406 A1    10/2008    Carpenter et al.
2011/0055580 A1     3/2011    Narasimhan

OTHER PUBLICATIONS

Stumpf. An Approach to a Trustworthy System Architecture Using Virtualization. [online] (2007). Springer-Verlag Berlin Heidelberg., pp. 192-202. Retrieved From the Internet <http://citeseerx.ist.psu.edu/viewdoc/download?doi=10.1.1.71.4087&rep=rep1&type=pdf>.*
Sailer et al. Design and Implementation of a TCG-based Integrity Measurement Architecture. [online] (Jan. 16, 2004). IBM., pp. 1-16. Retrieved From the Internet <http://citeseerx.ist.psu.edu/viewdoc/download?doi=10.1.1.86.5066&rep=rep1&type=pdf>.*

* cited by examiner

*Primary Examiner* — Emerson Puente
*Assistant Examiner* — Jonathan R Labud

(57) ABSTRACT

Embodiments allow management software applications to distinguish computational assets without the use of static, predetermined identifiers that are susceptible to duplication along with computational assets. Managers and computational assets are associated with authenticator values. Additionally, a manager and computational asset determine (e.g., negotiate) an expected nonce (number used once) to be provided by either party when requesting a transaction. Upon receiving a transaction request associated with an authenticator value and a transaction nonce, the sender's knowledge of the expected nonce is proven when the nonce associated with the request matches the expected nonce, and disproven otherwise. When such knowledge is proven, the manager treats the computational asset as the one originally associated with the computational asset authenticator value and negotiates a new nonce. When such knowledge is disproven, the manager treats the computational asset as a duplicate of the one that was originally associated with the computational asset authenticator value.

20 Claims, 9 Drawing Sheets

COMPUTATIONAL ASSET IDENTIFICATION WITHOUT PREDETERMINED IDENTIFIERS

BACKGROUND

Computational assets, such as software applications, may be monitored and/or managed by a management system. A management system may interact with a plurality of computational assets, distinguishing the computational assets from each other using a predetermined identifier (ID), such as an alphanumeric string.

The state of a computational asset (e.g., the values of one or more properties of the computational asset) may retain the business value of the computational asset. Accordingly, a computational asset may be subject to one or more forms of governance, such as asset inventory control, tracking, security, compliance auditing, change and remediation, licensing, scheduling, and/or resource consumption monitoring. Such operations may require the management system to monitor and control the computational asset and, therefore, to distinguish, identify, and track it. For example, the management system may distinguish computational assets from each other to enable the management system to maintain an inventory of computational assets and/or to recognize when new computational assets appear. Differentiating a computational asset may also be valuable in authorizing activities of an asset and/or controlling a computational asset by identifying it, sending it commands, and tracking its change.

Distinguishing, identifying, and tracking a computational asset may be challenging. Some computational assets such as virtual machines may be easily reproduced, and the copies may initially appear identical. Further, copies can be relocated (e.g., between host computing devices), such that one computational asset appears to change location, and/or become suspended, deleted, or offline. In addition, a copy of an original computational asset may remain identical to the original after copying while the original changes state.

A snapshot or backup copy may capture the instantaneous state of a computational asset, and the snapshot may be activated at a later time, such that the activated snapshot executes simultaneously with the original asset. The original asset may be restored, or "rolled back," to a previous state, while one or more copies created based on a subsequent state continue to execute and evolve independently. Further, multiple rolled-back versions of a computational asset may become active simultaneously.

In such scenarios, a static, predetermined identifier (an ID) may fail to uniquely identify a computational asset. For example, if a predetermined ID is stored as a property of a computational asset, that ID may be copied along with all other properties during duplication of the computational asset. Private properties are common to all snapshot versions. In addition, some distinguishing characteristics such as a hardware address (e.g., a Media Access Control address) or a digital signature may change.

With existing systems, without a manual configuration change (e.g., modification of a computational asset property), two instances of a computational asset may attempt to communicate with the management system using the same ID. In such a scenario, messages intended for one instance may be inadvertently directed to the other instance. Further, operating data (e.g., processor utilization) associated with the two instances may be conflated. Alternatively, a human operator may reconfigure one or both instances to ensure each is associated with a unique ID. However, such configuration may introduce undesired delay, manual effort, and a risk of error into the process of duplicating computational assets. Alternatively, an automated process may reconfigure one or both instances to ensure each is associated with a unique ID. However, such a process pre-supposes the automated process itself is able to detect and distinguish duplicate copies of the computational asset from the original and each other.

SUMMARY

One or more embodiments described herein provide automated distinction between computational assets despite copying, cloning, replication, migration, snapshot versioning, or other methods of duplication. In exemplary embodiments, computational assets are associated with computational asset authenticator values, and a manager software application executed by a management device negotiates an expected nonce (number used once) with the computational asset. The manager and the computational asset each associate the expected nonce with the opposite party's authenticator value. When either the manager or the computational asset initiates (e.g., requests) a transaction with the other party, it is expected to include with the transaction request proof of the sender's knowledge of the nonce. Similarly when replying to a request, the responder is expected to include with the transaction result proof of the responder's knowledge of the nonce. One way to prove mutual knowledge of the nonce is for the requests and results to be associated with the nonce. As an example, requests and results may be encrypted with a nonce, and successfully decrypting a message using the nonce verifies the sender knew the nonce. As another example, a nonce may be included in a request and/or a result and compared to an expected nonce for equality.

When the manager receives from a sender computational asset a transaction request associated with a computational asset authenticator value and a transaction nonce, the manager verifies the sender's knowledge of the expected nonce that is associated with the computational asset authenticator value from the transaction request. When the received transaction nonce is verified (e.g., equal to the expected transaction nonce), the management device treats the sender computational asset as the computational asset that was originally associated with the computational asset authenticator value. For example, the management device may perform one or more operations and transmit a result to the sender computational asset based on the transaction request. When the transaction nonce is not equal to the expected nonce, the management device treats the sender computational asset as a duplicate of the computational asset that was originally associated with the computational asset authenticator value. For example, the management device may attempt to associate the sender computational asset with a new computational asset authenticator value, such as by inviting the computational asset determines that the transmitted transaction nonce is equal to an expected transaction nonce associated with the manager software application at the computational asset sender computational asset to enroll with the management device.

When the computational asset receives from the management device a transaction request associated with a manager authenticator value and proof of the management device's knowledge of the transaction nonce, the computational asset verifies the sender's knowledge of the expected nonce that is associated with the management device's authenticator value from the transaction request. When the transaction nonce is verified, the computational asset treats itself as the computational asset that was originally associated by the management device with the computational asset authenticator value. For example, the computational asset may perform one or more operations and transmit a result to the sender management device based on the transaction request. When the transaction nonce is not verified, the computational asset must treat itself as a duplicate of the computational asset that was originally associated by the management device with the computational asset authenticator value. For example, the computational asset may attempt to generate a new computational asset authenticator value and request re-enrollment with the management device. The computational asset unable to verify the nonce must treat itself as a duplicate as it will not be able to negotiate the next transaction nonce without knowledge of the previous nonce value.

This summary introduces a selection of concepts that are described in more detail below. This summary is not intended to identify essential features, or to limit in any way the scope of the claimed subject matter.

DETAILED DESCRIPTION

Figure 1:
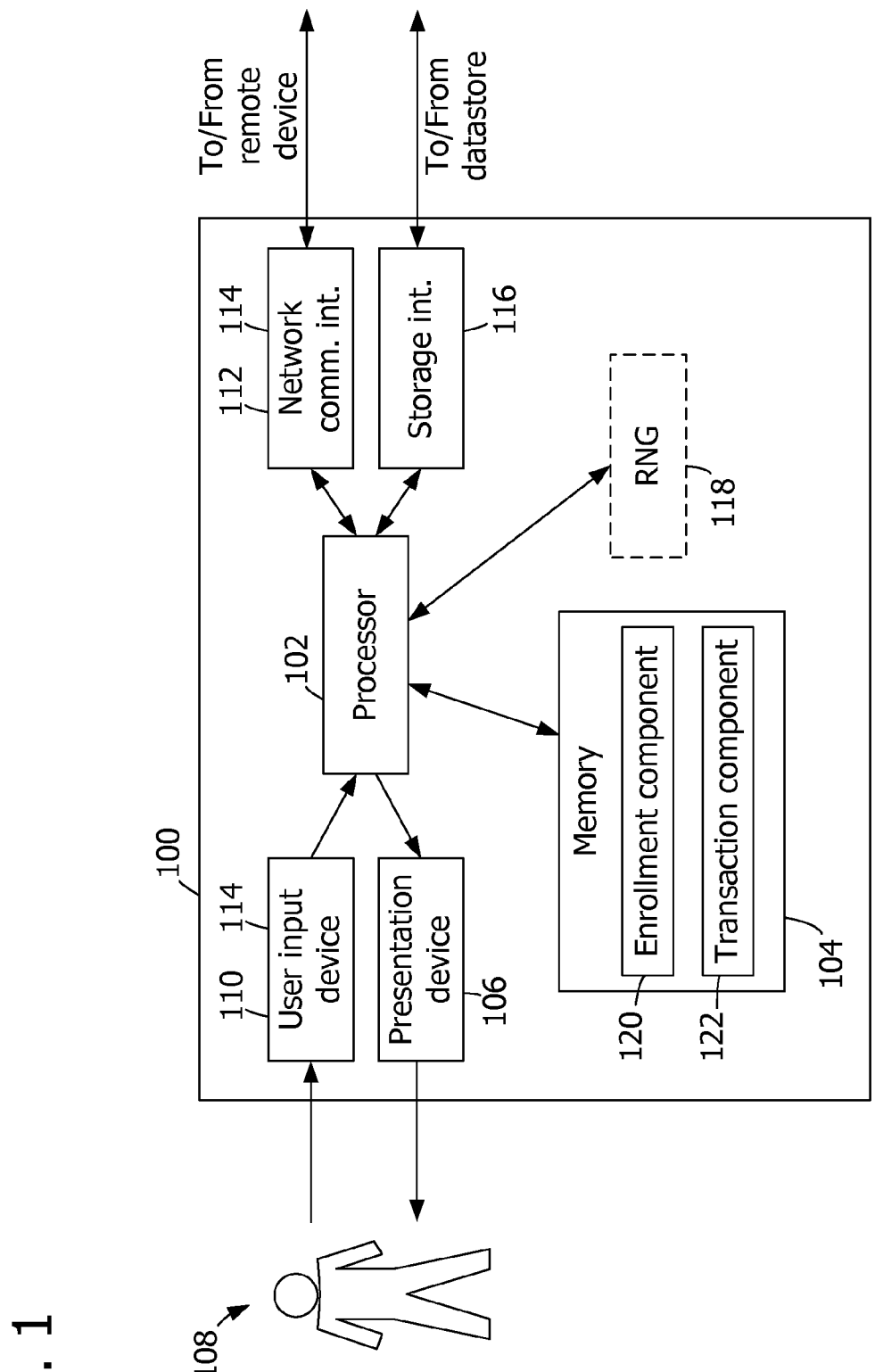
FIG. 1 is a block diagram of an exemplary computing device.

Embodiments described herein facilitate uniquely identifying computational assets without relying on static, predetermined asset identifiers (IDs). For example, when a computational asset is duplicated, two identical instances of the computational asset are created. In exemplary embodiments, the two instances may be distinguished from each other through an automated authentication process, such that both instances may be discretely monitored and/or managed without manual intervention by a human operator.

As used herein, the term "computational asset" refers to a software application that is subject to (e.g., responsive to) commands from a manager software application, or "manager," executed by a management device. Computational assets may include, for example, virtual machines (VMs); software appliances; management agents, such as a Common Information Management (CIM) agent, a Simple Network Management Protocol (SNMP) agent, and/or a configuration management agent; cloud services, mobile agents (e.g., mobile software application code and a corresponding application state); and/or business services (e.g., Information Technology Infrastructure Library services.

A computational asset includes a computation (e.g., an algorithm and a state) that has one or more of the following characteristics: (1) Is easily reproduced; (2) Is not easily differentiated after reproduction; (3) Has inspectable attributes and properties; (4) Evolves independently after reproduction; and (5) Is managed as a resource by (a) being subject to configuration tests, policies, or audits; (b) being the target of configuration change actions; and/or (c) maintaining synchronized state with other applications (e.g., computational assets).

In some embodiments, being easily reproduced indicates that a computational asset can be duplicated, replicated, and/or replaced by a facsimile without interaction with the management application. Further, there may be no inherent limits on the number of copies, on whether the copies can themselves be duplicated, and/or on the number of generations of reproduction.

In some embodiments, not easily differentiated means that copies of a computational asset may share the same identifying characteristics with other copies, and that regardless of the method of reproduction (e.g., duplication of an original copy, replication without an original copy, and/or replacement that destroys the original copy), one copy may not be discerned from others or any original by inspection of only that copy.

A computational asset may have attributes and/or properties that collectively constitute the state of the computational asset. This state may be inspected, and its attribute and property values may change over time in response to events, activity of the computation, and/or commands from a management application. These state changes may improve the computational asset's worth and/or be advantageous to the purpose of the computational asset. In addition, such state changes may cause the state of the computational asset to drift from policy compliance, rendering the computational asset subject to corrective commands from the management application. The states of computational assets that begin with the same state may evolve independently after reproduction. Accordingly, initially identical copies of a computational asset may become differentiated over time.

In exemplary embodiments, one or more computing devices execute computational assets. In addition, one or more computing devices, referred to as management devices, execute a management software application, or "manager," that interacts with (e.g., monitors and/or manages) computational assets. For example, a manager may collect operating data (e.g., computing resource utilization) associated with each of a plurality of computational assets. In some embodiments, a manager executes transactions and sends results upon receiving requests from computational assets. In some embodiments, the computational asset executes transactions and sends results upon receiving requests from managers. In some embodiments, both the manager and computational asset can send requests or receive results. For example, a computational asset may request a confirmation that the computational asset is associated with a valid license, and the manager may transmit to the computational asset a transaction result indicating whether such a license is associated with the computational asset or has already been used by some other copy.

Further, a manager may transmit a command instructing a computational asset and/or a computing device to execute a transaction and/or operation. For example, the manager may transmit a configuration change command to a computational asset, instructing the computational asset to apply a specified configuration to itself. As another example, the manager may coordinate a migration of a computational asset from a first host computing device to a second host computing device by instructing the first computing device to terminate execution of the computational asset, moving the computational asset to the second host computing device, and instructing the second host computing device to begin execution of the computational asset. As another example, the manager may transmit to the computational asset a request to apply an update to, or "patch", an installed software package, and the computational asset response may indicate that the computational asset has been reverted or "rolled-back" to a version prior to the installation of the software package and hence is not the version of the computational asset capable of being patched.

In some embodiments, a computational asset is subject to one or more configuration policies (e.g., constraints on allowable property values), and the management application enforces such a configuration policy by inspecting properties of the computational asset. In addition, or alternatively, the management application may transmit to the computational asset one or more configuration commands that instruct the computational asset to alter property values, as described above. The management application may maintain a copy of the state of the computational asset and repeatedly (e.g., periodically, continuously, and/or upon some event, such as a transaction associated with the computational asset) synchronize the copy with the state that is maintained by the computational asset.

Embodiments described enable a manager to distinguish computational assets from each other regardless of whether the manager and/or computational assets are hosted in a physical or virtual environment, and regardless of whether reproduction results in virtual, physical, or mixed copies. The process may provide an assurance to the manager that the state of a computational asset is the state expected with respect to manager-initiated changes, and an assurance to the computational asset that the manager is the one expected.

In exemplary embodiments, a computational asset is associated with a computational asset authenticator value (e.g., a security certificate, such as an X.509 certificate) that is dynamically generated by the computational asset and/or the manager as part of an enrollment process in which the computational asset is registered with the manager. During interactions between the computational asset and the manager, the computational asset provides the computational asset authenticator value along with proof of knowledge of a transaction nonce (number used once) to the manager. For example, the computational asset may provide an offered transaction nonce to establish proof of knowledge a previously negotiated nonce.

The manager initially recognizes (e.g., authenticates) the computational asset using the computational asset authenticator value and uses the authenticator to look up the expected transaction nonce. The manager then verifies the computational asset has proven knowledge of the expected nonce that the manager previously associated with the provided computational asset authenticator value. When the transaction nonce is verified (e.g., is equal to the expected nonce), the manager treats the sender computational asset as the computational asset that was previously associated with the computational asset authenticator value. When the transaction nonce is not verified (e.g., differs from the expected nonce), the manager treats the sender computational asset as a duplicate of the computational asset that was previously associated with the computational asset authenticator value.

Notably, the fact that a computational asset proves it knows the expected transaction nonce may not always indicate that the computational asset is, in fact, the same computational asset that was previously associated with the computational asset authenticator value. For example, the computational asset in question may be a duplicate of an original computational asset, created after the expected nonce was associated with the original computational asset. Regardless of whether the computational asset in question is the original or a duplicate, it may be expected to be functionally equivalent to the original computational asset, capable of assuming the original's identity such that considering the computational asset in question to be the original computational asset results in proper operation.

In a case where a computational asset associated with a particular computational asset authenticator value is duplicated, the manager may treat as the original computational asset whichever computational asset first provides the computational asset authenticator value and proves knowledge of a transaction nonce equal to the expected nonce associated with that computational asset authenticator value. Accordingly, the duplicate computational asset may be treated as the original, as described above, and the original computational asset may be treated as a duplicate. For example, the manager may attempt to associate the original computational asset with a new computational asset authenticator value, such as by executing the enrollment process with the original computational asset.

FIG. 1 is a block diagram of an exemplary computing device 100. Computing device 100 includes a processor 102 for executing instructions. In some embodiments, executable instructions are stored in a memory 104. Memory 104 is any device allowing information, such as executable instructions, computational assets, cryptographic keys, authenticator values, transaction nonces, inventory tables, enrollment invitation tables, enrollment tables, credential tables, and/or other data, to be stored and retrieved. For example, memory 104 may include one or more random access memory (RAM) modules, flash memory modules, hard disks, solid-state disks, and/or optical disks.

Computing device 100 also includes at least one presentation device 106 for presenting information to a user 108. Presentation device 106 is any component capable of conveying information to user 108. Presentation device 106 may include, without limitation, a display device (e.g., a liquid crystal display (LCD), organic light emitting diode (OLED) display, or "electronic ink" display) and/or an audio output device (e.g., a speaker or headphones). In some embodiments, presentation device 106 includes an output adapter, such as a video adapter and/or an audio adapter. An output adapter is operatively coupled to processor 102 and configured to be operatively coupled to an output device, such as a display device or an audio output device.

The computing device 100 may include a user input device 110 for receiving input from user 108. User input device 110 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of presentation device 106 and user input device 110.

Computing device 100 also includes a network communication interface 112, which enables computing device 100 to communicate with a remote device (e.g., another computing device 100) via a communication medium, such as a wired or wireless packet network. For example, computing device 100 may transmit and/or receive data via network communication interface 112. User input device 110 and/or network communication interface 112 may be referred to as an input interface 114 and may be configured to receive information from a user.

Computing device 100 further includes a storage interface 116 that enables computing device 100 to communicate with one or more datastores, which store virtual disk images, software applications, and/or any other data suitable for use with the methods described herein. In exemplary embodiments, storage interface 116 couples computing device 100 to a storage area network (SAN) (e.g., a Fibre Channel network) and/or to a network-attached storage (NAS) system (e.g., via a packet network). The storage interface 116 may be integrated with network communication interface 112.

Computing device 100 may also include a hardware random number generator (RNG) 118. RNG 118 generates a stream of random values that are accessible by processor 102. For example, RNG 118 may generate random values based on one or more physical processes exhibiting a characteristic that varies randomly over time. In some embodiments, RNG 118 is initialized or "seeded" with a value by processor 102. For example, processor 102 may provide to RNG 118 a seed value that is based on movement detected by user input device 110 and/or the timing of events detected by user input device 110, network communication interface 112, and/or storage interface 116. In addition, or alternatively, computing device 100 may include a source of randomness other than RNG 118. For example, computing device 100 may execute a device driver that collects randomness from data and/or event timings provided by components of computing device 100, such as user input device 110, network communication interface 112, storage interface 116, and/or processor 102.

In exemplary embodiments, memory 104 stores computer-executable instructions for performing one or more of the operations described herein. Memory 104 may include one or more computer-readable storage media that have computer-executable components embodied thereon. In the example of FIG. 1, memory 104 includes an enrollment component 120 and a transaction component 122.

When executed by processor 102, enrollment component 120 causes processor 102 to transmit enrollment invitations to one or more computational assets and to enroll one or more computational assets based on receiving enrollment requests from the computational assets. These invitations may travel across network communication interface 112 to computational assets located on one or more remote instances of computing device 100. When executed by processor 102, transaction component 122 causes processor 102 to determine expected transaction nonces associated with computational assets, to receive transaction requests from computational assets, and to transmit transaction results to computational asset based on such received transaction requests when appropriate. Any portion of the illustrated components may be included in memory 104 based on the function of computing device 100.

Embodiments are described herein with reference to virtual machines (VMs). However, it is contemplated that the methods described may be applied to any type of computational asset.

Figure 2:
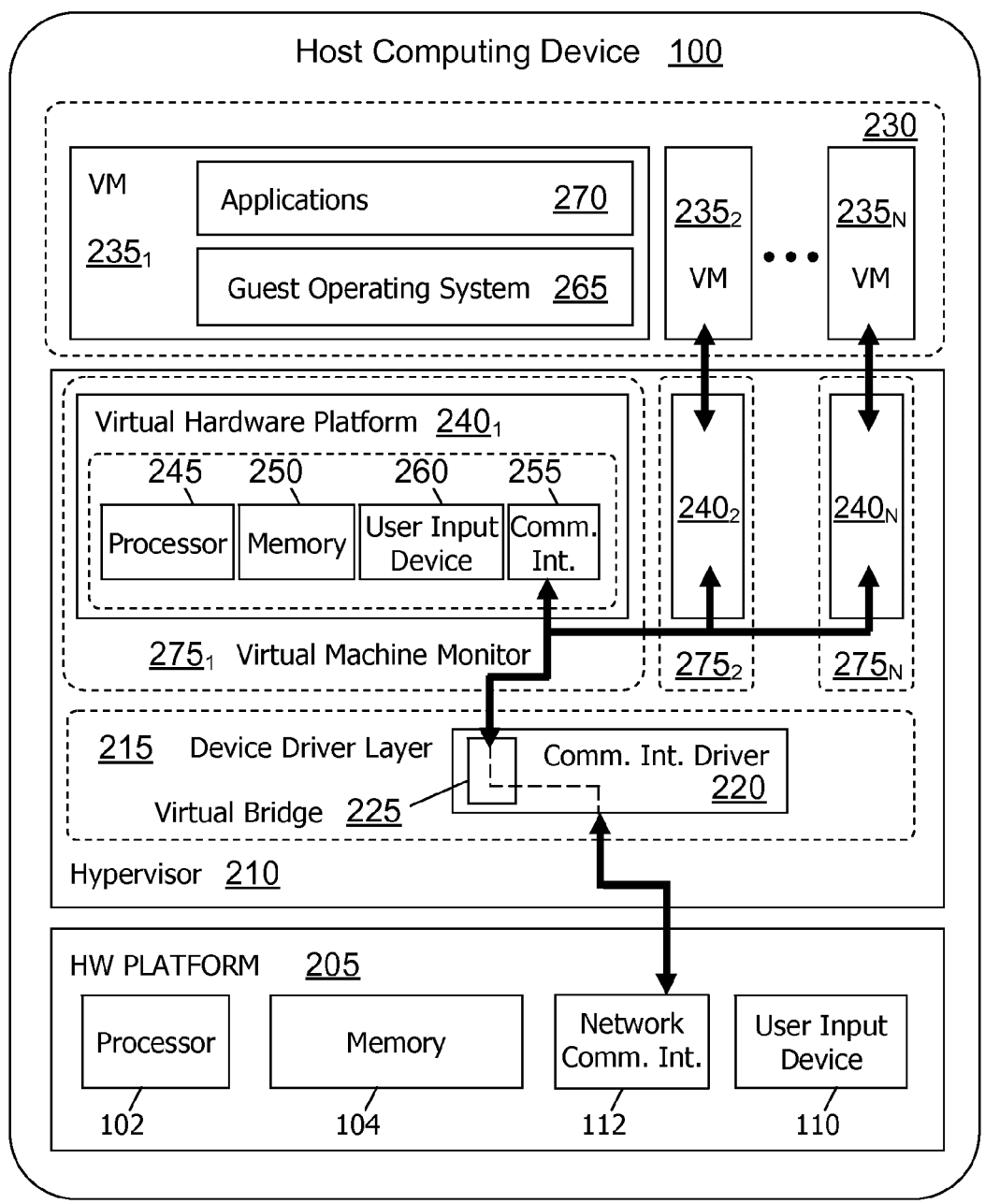
FIG. 2 is a block diagram of virtual machines that are instantiated on a computing device, such as the computing device shown in FIG. 1.

FIG. 2 depicts a block diagram of VMs $235_1, 235_2 \ldots 235_N$ that are instantiated on a computing device 100, which may be referred to as a host computing device or simply a host. Computing device 100 includes a hardware platform 205, such as an x86 architecture platform. Hardware platform 205 may include processor 102, memory 104, network communication interface 112, user input device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$)—examples of computational assets—may be concurrently instantiated and executed. Hypervisor 210 includes a device driver layer 215, and maps physical resources of hardware platform 205 (e.g., processor 102, memory 104, network communication interface 112, and/or user input device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user input device 260 and other emulated I/O devices in VM $235_1$).

In some embodiments, memory 250 in first virtual hardware platform $240_1$ includes a virtual disk that is associated with or "mapped to" one or more virtual disk images stored in memory 104 (e.g., a hard disk or solid state disk) of computing device 100. The virtual disk image represents a file system (e.g., a hierarchy of directories and files) used by first virtual machine $235_1$ in a single file or in a plurality of files, each of which includes a portion of the file system. In addition, or alternatively, virtual disk images may be stored in memory 104 of one or more remote computing devices 100, such as in a storage area network (SAN) configuration. In such embodiments, any quantity of virtual disk images may be stored by the remote computing devices 100.

Device driver layer 215 includes, for example, a communication interface driver 220 that interacts with network communication interface 112 to receive and transmit data from, for example, a local area network (LAN) connected to computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Such applications may be examples of computational assets nested inside VM computational assets. Virtual hardware platforms $240_1$-$240_N$ may be considered to be part of virtual machine monitors (VMM) $275_1$-$275_N$ which implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an embodiment of the disclosure is included as a component in VMware's ESX brand software, which is commercially available from VMware, Inc.

Figure 3:
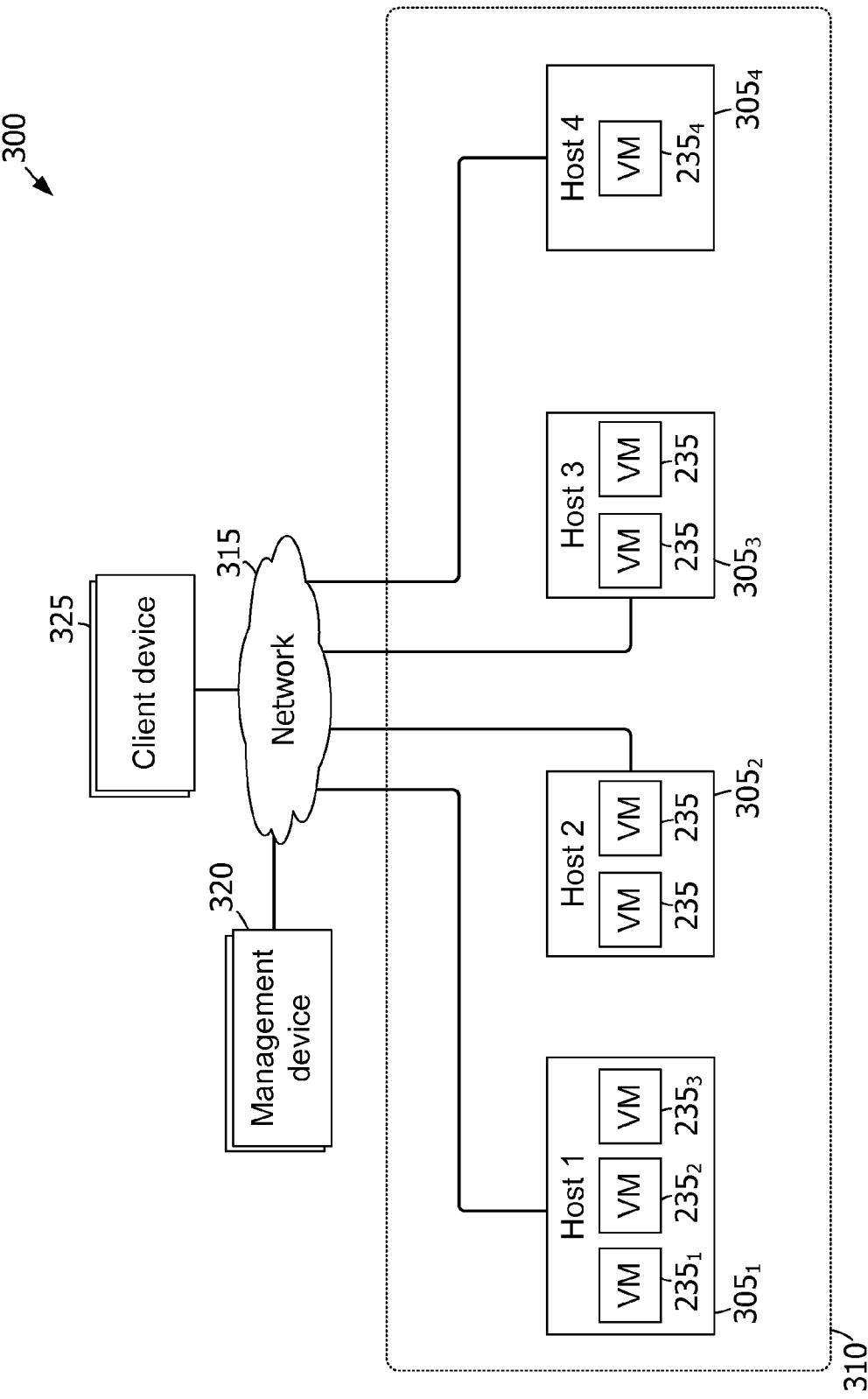
FIG. 3 is a block diagram of an exemplary cluster system including computing devices and virtual machines.

FIG. 3 is a block diagram of an exemplary cluster system 300 of hosts 305 and virtual machines (VMs) 235. Cluster system 300 includes a fault domain 310 with a first host $305_1$, a second host $305_2$, a third host $305_3$, and a fourth host $305_4$. Each host 305 executes one or more computational asset. For example, first host $305_1$ executes first VM $235_1$, second VM $235_2$, and third VM $235_3$, and fourth host $305_4$ executes fourth VM $235_4$. It is contemplated that fault domain 310 may include any quantity of hosts 305 executing any quantity of computational asset. Further, VMs 235 hosted by hosts 305 may execute other computational asset, such as instances of network services (e.g., web applications and/or web services), distributed computing software, and/or any other type of software that is executable by computing devices such as hosts 305.

Hosts 305 communicate with each other via a network 315. Cluster system 300 also includes one or more management devices 320, which are coupled in communication with hosts 305 via network 315. In exemplary embodiments, a management device 320 monitors and controls hosts 305. For example, management device 320 may monitor performance metrics (e.g., application performance metrics and/or host performance metrics) associated with hosts 305 and may further coordinate the execution of VMs and/or other computational assets by hosts 305 based on the performance metrics. One or more client devices 325 are coupled in communication with network 315, such that client devices 325 may submit requests to hosts 305. For example, hosts 305 may execute instances of computational assets that provide data in response to requests from client devices 325 or requests from management devices 320.

Although management device 320 is shown outside fault domain 310, the functions of management device 320 may be incorporated into fault domain 310. For example, management device 320 may be included in fault domain 310. Alternatively, the functions described with reference to management device 320 may be performed by one or more hosts 305 or VMs 235 executed by one or more hosts 305 in fault domain 310 thus making the management functions themselves a possible computational asset. Hosts 305, management device 320, and/or client device 325 may be computing devices 100 (shown in FIG. 1).

In exemplary embodiments, computational assets such as VMs 235 may be reproduced, with the new instance executed by any host 305 in cluster system 300. When a computational asset is reproduced, the original and all of the copies share the expected transaction nonce value until one of them interacts with the manager executed by management device 320 and negotiates a new expected transaction nonce value unknown to the other copies. From then, the copy knowing the new expected transaction nonce value may be distinguished by its diverging interaction session (e.g., different nonce values) with the manager. If there is no distinguishing session, then any of the copies may be suitable for treatment as the original, and other copies become detectable as these copies attempt to extend the original's session, such as requesting transactions from the manager. The copies can then be assigned new identities (e.g., computational asset authenticator values and expected nonces) that will distinguish them from each other. By tracking sessions simultaneously with management transactions, synchronization of each computational asset's identity and the asset's expected state may be achieved.

The embodiments described may be implemented using a protocol governing interaction between two state machines comprising a session (a finite state model): one executed by the management application, and one executed by the computational asset. In exemplary embodiments, three kinds of protocol interactions take place: enrollment (identity negotiation), session verification, and management transactions (requests and results). Enrollment of a computational asset with a manager may occur prior to the execution of a management transaction. Following enrollment, session verification may be performed simultaneously with each management transaction. A computational asset is distinguished by the session in which it participates. After reproduction of a computational asset, any one copy of the computational asset may resume the session interactions. Other computational assets may be re-enrolled to start new sessions and hence generate new identities.

The state machines and transactions manipulate various data elements including, for example (1) An enrollment invitation issued by the manager; (2) An enrollment request generated by the computational asset; (3) An authenticator value for each computational asset; (4) An authenticator value for each manager; (5) An expected transaction nonce T; (6) An enrollment table maintained by the manager; (7) An enrollment invitation table maintained by the manager; (8) An inventory table maintained by the manager; and/or (9) A credential table maintained by the computational asset. Data elements 1-9 may be stored in memory 250 and/or be part of components 120 and 122, within management device 320 or within computational assets 235 within devices 305.

In exemplary embodiments, each of the management devices 320 and computational assets (e.g., VMs 235) is associated with (e.g., includes and/or accesses) a cryptographic quality RNG 118 (shown in FIG. 1) initialized with entropy. Management devices 320 may use an RNG 118 to generate key pairs, manager authenticator values, random values used to calculate transaction nonces, and/or transaction nonces. Computational assets may use an RNG 118 to generate key pairs, computational asset authenticator values, random values used to calculate transactions nonces, and/or transaction nonces. Further, the RNGs 118 associated with computational assets may be configured to add sufficient entropy during operation to enable RNGs 118 used by duplicate computational assets to produce different and independent random number streams.

Prior to issuing invitations, the manager generates an authenticator value. In some embodiments the manager generates a public-private cryptographic key pair, embeds the public key in an X.509 certificate, and uses the X.509 certificate as the manager's authenticator value. Subsequently, the manager issues enrollment invitations that are verifiable with the authenticator value. Candidate computational assets may accept an enrollment invitation by converting the enrollment invitation into an enrollment request and transmitting the enrollment request to a manager. In some embodiments, one enrollment invitation is transmitted (e.g., broadcast and/or multicast) to a plurality of computational assets, any number of which may respond with an enrollment request.

In converting the enrollment invitation to an enrollment request, a computational asset generates a computational asset authenticator value and a verifiable enrollment request.

In some embodiments the computational asset generates a public-private cryptographic key pair, embeds the public key in an X.509 certificate, and uses the X.509 certificate as the authenticator value. The manager determines whether to accept the enrollment request based on properties of the computational asset and the associated invitation. After enrollment, the manager and the computational asset negotiate an ephemeral expected transaction nonce for the next interaction between the manager and the computational asset. Subsequently, upon every interaction between the manager and the computational asset, the manager, or the computational asset, or the two collaboratively negotiate a new expected transaction nonce that depends on some of: the authenticator values, random values from the RNG 118, a transaction sequence number, and/or the previous transaction nonce. Duplicated computational assets are recognized when such computational assets or the manager attempt to reuse a nonce associated with an authenticator when that nonce has already changed. After detection, copies may be re-enrolled. This re-enrollment creates a new separate identity (e.g., authenticators and nonces) for the duplicates, such that the duplicates are distinguished from the original and from each other by their now different authenticator values.

In exemplary embodiments, separate instances of the finite state machines described are executed for each manager-asset pair. Each pair is associated with a distinct session finite state model.

One or more of the following protocol interactions may occur between a manager and a computational asset: enrollment (identity negotiation), session verification, and management transactions (e.g., commands, requests, and results). The management transactions between the manager and the computational asset include, for example, requests sent from a computational asset to the manager and/or commands sent from the manager to the computational asset. The other interactions in the state machines surround the management transactions and allow the identity of the computational asset to be established, such that the computational asset may be enrolled with the manager. After enrollment, the computational asset may be referred to by its established identity.

Figure 4:
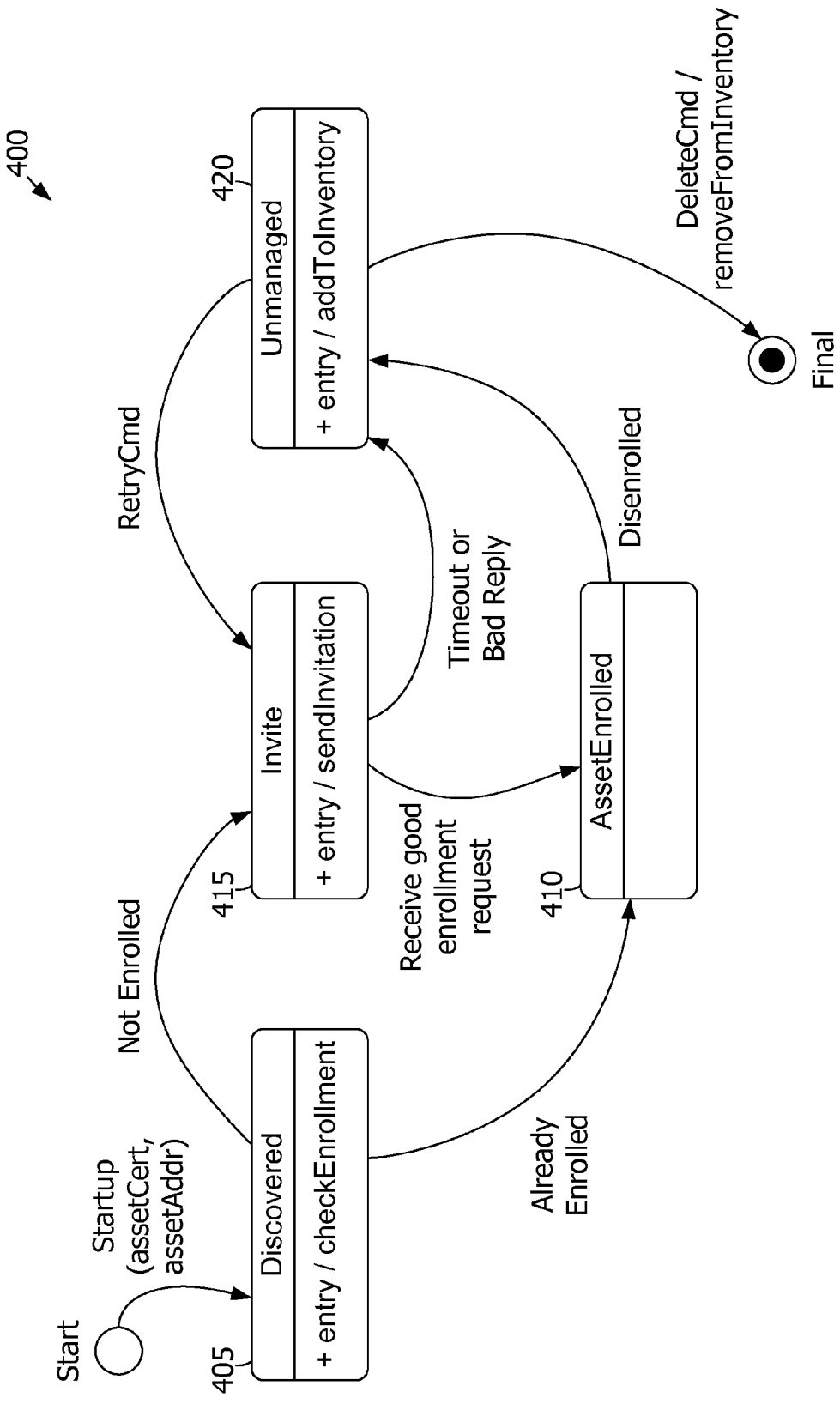
FIG. 4 is an exemplary state diagram representing states and state transitions used in exemplary methods for communicating with a computational asset.
Figure 5:
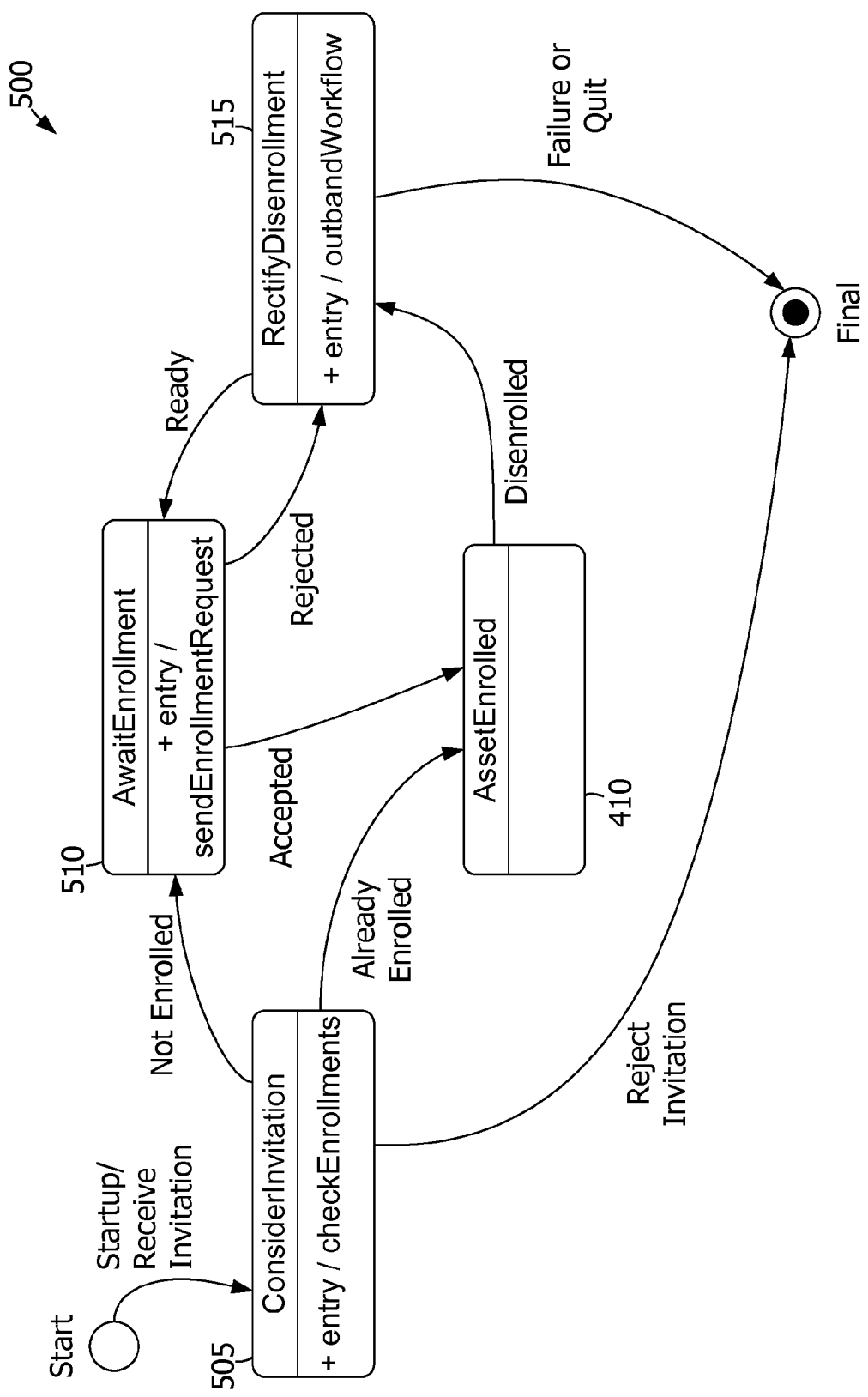
FIG. 5 is an exemplary state diagram representing states and state transitions used in exemplary methods for communicating with a management device.

FIG. 4 is an exemplary state diagram 400 representing states and state transitions used in exemplary methods for communicating with a computational asset, such as a VM 235 (shown in FIGS. 2 and 3). FIG. 5 is an exemplary state diagram 500 representing states and state transitions used in exemplary methods for communicating with a manager executed by a management device, such as management device 320. While the embodiments described are operable with VMs 235, the general term computational asset is used below, as it is contemplated that such embodiments are generally applicable to any computational assets, as described herein. Accordingly, a term such as computational asset authenticator value may be understood as a generalization of a more specific (e.g., VM-related) term, such as VM authenticator value.

Referring to FIGS. 3-5, in exemplary embodiments, the manager maintains an inventory of computational assets and associates a state with each computational asset according to state diagram 400. Each computational asset maintains its own state with respect to one or more management devices 320 according to state diagram 500. In some embodiments, the computational asset requests the execution of a transaction from the manager. In some embodiments, the manager requests the execution of a transaction from the computational asset. Accordingly, the originator of the request may be referred to simply as a sender.

Upon startup, the manager generates a manager authenticator value if one does not already exist. In some embodiments, data exchanged between the manager and computational assets is digitally signed and/or encrypted. In such embodiments, the manager may use an X.509 certificate as the authenticator value by generating a cryptographic key pair including a private key and a public key and including the public key in an X.509 certificate which is the authenticator. The manager may sign the data using the private key and may provide the public key embedded in the X.509 certificate to computational assets, which authenticate the data using the public key. Further, computational assets may encrypt data using the public key, and the manager may decrypt such data using the private key.

Upon startup, computational asset 235 generates an asset authenticator value if one does not already exist. In some embodiments data exchanged between the manager and computational assets 235 is digitally signed and/or encrypted. In such embodiments, computational asset 235 may use an X.509 certificate as the authenticator value by generating a cryptographic key pair including a private key and a public key and including the public key in an X.509 certificate which is the authenticator. Computational asset 235 may sign the data using the private key and may provide the public key embedded in the X.509 certificate to the management device, which authenticates the data using the public key. Further, the management device may encrypt data using the public key, and computational asset 235 may decrypt such data using the private key.

The manager becomes aware of the presence of a computational asset, such as by receiving an asset authenticator value (e.g., a X.509 certificate) and a network address that are associated with the computational asset. For example, the asset authenticator value and the network address may be provided by the computational asset itself and/or by an asset discovery component executed by the manager or another computing device 100 (shown in FIG. 1).

Upon becoming aware of the computational asset, the manager associates a Discovered state 405 with the computational asset. As Discovered state 405 is entered, the manager executes a checkEnrollment function to determine whether the computational asset is already enrolled with the manager.

In exemplary embodiments, the manager maintains an enrollment table that includes one or more attributes (e.g., an authenticator value, an expected transaction nonce, and/or a sequence number) associated with each enrolled computational asset. The authenticator value is a datum obtained from the computational asset and may be used to authenticate the computational asset prior to post-enrollment communication. For example, if the authenticator value is a security certificate (e.g., an X.509 certificate), the manager may authenticate the computational asset by verifying that the associated security certificate is active (e.g., not expired) and associated with a trusted certification authority (CA). The sequence number is a monotonically increasing value that increments once per transaction between the manager and the computational asset. The sequence number may be used to ensure that transactions are considered in order. The expected transaction nonce is an unpredictable value that changes once per transaction between the manager and the computational asset. In exemplary embodiments, the manager and computational asset collaborate on the calculation of each nonce and neither can unilaterally determine the nonce value. The expected transaction nonce may be used to detect duplicate computational assets.

The manager determines whether the computational asset is included in the enrollment table, such as by selecting the record in the enrollment table, if any, that includes the computational asset authenticator value associated with the computational asset. If the computational asset is included in the enrollment table, the computational asset is considered already enrolled. The manager associates an AssetEnrolled state 410 with the computational asset. The manager proceeds to determine a substate of AssetEnrolled state 410, as described below with reference to FIG. 6. For example, the manager may proceed to negotiate a transaction nonce with the computational asset. The manager may also ensure that the computational asset includes or "knows" a private key associated with the computational asset authenticator value, such as by encrypting a transmission to the computational asset with a public key corresponding to the private key and/ or by decrypting a transmission from the computational asset using a public key corresponding to the private key.

If the computational asset is not included in the table, the computational asset is considered not enrolled, and the manager associates an Invite state 415 with the computational asset. Upon entry to Invite state 415, the manager transmits an enrollment invitation to the address associated with the computational asset. The enrollment invitation includes the manager authenticator value associated with the manager.

In exemplary embodiments, the manager maintains an enrollment invitation table that includes a list of issued enrollment invitations. Unenrolled computational assets may enroll with the manager by submitting an enrollment request including an invitation, as described below. The manager may use the enrollment invitation table to determine whether an invitation is valid (e.g., whether an invitation referenced by an enrollment request exists), has already been used by a computational asset, and/or is expired. For example, when issuing an enrollment invitation, the manager may associate an expiration time, equal to the current time plus a predetermined duration, with the enrollment invitation in the enrollment invitation table. Subsequently, the invitation may be considered expired if the current time is after the expiration time.

In some embodiments, each enrollment invitation is a data structure that enables at most one enrollment request. In other embodiments, a management device may allow multiple enrollments from each enrollment invitation and/or enrollment invitation table entry by placing a fixed value in the invitation table entry and decrementing the value upon receiving each enrollment request, and denying further enrollments when the table value reaches zero. In addition, or alternatively, the management device may stipulate that enrollment requests be submitted over secure and/or authenticated channels, and/or stipulate that enrollment requests be submitted before an expiration time. In addition to enrollment stipulations, an invitation may include an address (e.g., a network address) of the manager and/or the manager authenticator value associated with the manager. The manager may directly distribute enrollment invitations, and/or distribute them indirectly and/or out-of-band (e.g., by publishing to a message queue that is read by computational assets). In some embodiments, enrollment invitations are signed by the manager. In some embodiments, the source of an enrollment invitation is authenticated using the manager authenticator value and the content verified by checking the digital signature.

Upon startup and/or upon receiving an enrollment invitation from the manager, as described below, a computational asset generates a computational asset authenticator value as previously described if one does not already exist, and enters a ConsiderInvitation state 505. As the computational asset enters ConsiderInvitation state 505, the computational asset executes a checkEnrollments function to determine whether the computational asset is enrolled or can become enrolled with the manager.

In exemplary embodiments, the computational asset determines whether it is enrolled with the manager by determining whether an entry associated with the manager is included in a credential table stored by the computational asset. The credential table includes, for example, a manager authenticator value, a sequence number, and/or a transaction nonce for each the manager with which the computational asset is enrolled. In addition, for each the manager, the computational asset may store the computational asset authenticator value with which it enrolled with the respective the manager, enabling the authenticator value used with one manager to change without affecting others. When a computational asset is enrolled with the manager, the associated computational asset authenticator value is included in the enrollment table maintained by the manager. The manager authenticator value is included in the credential table maintained by the computational asset. Further, the management device's enrollment table and the computational asset's credential table may include the same transaction nonce and/or sequence number.

If the computational asset is already enrolled with the manager, the computational asset determines its own state to be AssetEnrolled state 410. In exemplary embodiments, the computational asset proceeds to determine a substate of AssetEnrolled state 410 with respect to the manager, as described below with reference to FIG. 6. For example, the computational asset may proceed to negotiate a transaction nonce with the manager. The computational asset may also ensure that the manager includes (knows) a private key associated with the manager authenticator value, such as by encrypting the nonce negotiation with the manager using the public key corresponding to the authenticator.

The computational asset may reject an enrollment invitation from the manager. For example, the computational asset may reject an enrollment invitation based on determining that the manager authenticator value included in the enrollment invitation is invalid (e.g., expired and/or associated with an untrusted certification authority) or that the enrollment invitation is invalid (e.g. the digital signature value of the enrollment invitation does not verify with the authenticator's corresponding public key). In such a scenario, the computational asset exits the state transitions shown in state diagram 500. The computational asset may subsequently return to ConsiderInvitation state 505, for example, if the computational asset receives another enrollment invitation from the manager.

When the computational asset determines that the computational asset is not enrolled with the manager and that the enrollment invitation received from the manager is valid, the computational asset enters an AwaitEnrollment state 510. Upon entering AwaitEnrollment state 510, the computational asset executes a sendEnrollmentRequest function, transmitting an enrollment request to the manager. The enrollment request is associated with (e.g., includes and/or references) the enrollment invitation and/or the computational asset authenticator value associated with the computational asset.

The manager receives the enrollment request and, if the enrollment request is valid, the manager accepts the enrollment request, such as by transmitting an enrollment acceptance to the computational asset. The manager enrolls the computational asset based on the enrollment request. For example, the manager may add the computational asset authenticator value associated with the computational asset to an enrollment table. With the enrollment request accepted, the manager and the computational asset advance to AssetEnrolled state 410, which is described in more detail below with reference to FIG. 6.

If the manager determines that a timeout has occurred and/or receives an invalid enrollment request from the computational asset, the manager associates an Unmanaged state 420 with the computational asset. For example, a timeout may occur when no enrollment request is received within a predetermined duration after transmitting the enrollment invitation. An enrollment request may be considered invalid when the computational asset authenticator value associated with the enrollment request is expired and/or associated with an untrusted certification authority. An enrollment request may also be considered invalid when the enrollment request's digital signature does not validate using the public key corresponding to the computational asset's authenticator value. Upon entering Unmanaged state 420, the manager executes an addToInventory function, adding the computational asset to an inventory of known computational assets if the computational asset is not already included in the inventory. In exemplary embodiments, the manager maintains an unenrolled inventory table containing a list of contact addresses (e.g., network addresses) and authenticator values associated with computational assets that are not enrolled with the manager. The manager may issue enrollment invitations using the information in the inventory table.

When the manager determines that the enrollment request is invalid, the manager rejects the enrollment request, such as by transmitting an enrollment rejection to the computational asset. The computational asset advances to a RectifyDisenrollment state 515. In addition, or alternatively, the computational asset may advance to RectifyDisenrollment state 515 if the manager disenrolls (e.g., removes the enrollment associated with) the computational asset (e.g., due to an error) while the computational asset is in AssetEnrolled state 410. Upon entering RectifyDisenrollment state 515, the computational asset executes an out-of-band workflow (outbandWorkflow) function to rectify the cause of the rejection and/or the disenrollment. The out-of-band workflow does not use the state and transition interactions described herein. For example, the computational asset may validate its own computational asset authenticator value. If the authenticator value is corrupt, expired, and/or associated with an untrusted certification authority, for example, the computational asset may generate a new computational asset authenticator value. If a corrective action, such as regenerating the computational asset authenticator value, is taken, the computational asset returns to AwaitEnrollment state 510 and proceeds as described above. Otherwise, the computational asset may exit the state transitions shown in state diagram 500.

In some embodiments, when a computational asset is associated with Unmanaged state 420, the manager retries the invitation process by proceeding to Invite state 415, as described above. For example, the manager may proceed to Invite state 415 based on receiving a retry command (RetryCmd, e.g from a user) and/or based on a predetermined duration elapsing after entry to Unmanaged state 420. Retrying the invitation enables the manager to enroll the computational asset after encountering a temporary malfunction, such as a failure in communication between the manager and the computational asset. The manager may repeatedly retry inviting the computational asset as long as the computational asset remains in the inventory.

In some embodiments, while in Unmanaged state 420, the manager receives a delete command (DeleteCmd, e.g., from a user) and, in response, executes a removeFromInventory function to remove the computational asset from the inventory. In addition, or alternatively, the manager may execute the removeFromInventory function based on determining that the computational asset is disabled, terminated, decommissioned, malfunctioning, unresponsive, and/or otherwise unavailable. In some embodiments, the manager may subsequently associate Discovered state 405 with the computational asset and proceed as described above. For example, if the computational asset is disabled and then repaired, the manager may again become aware of the computational asset upon the restart.

Figure 6:
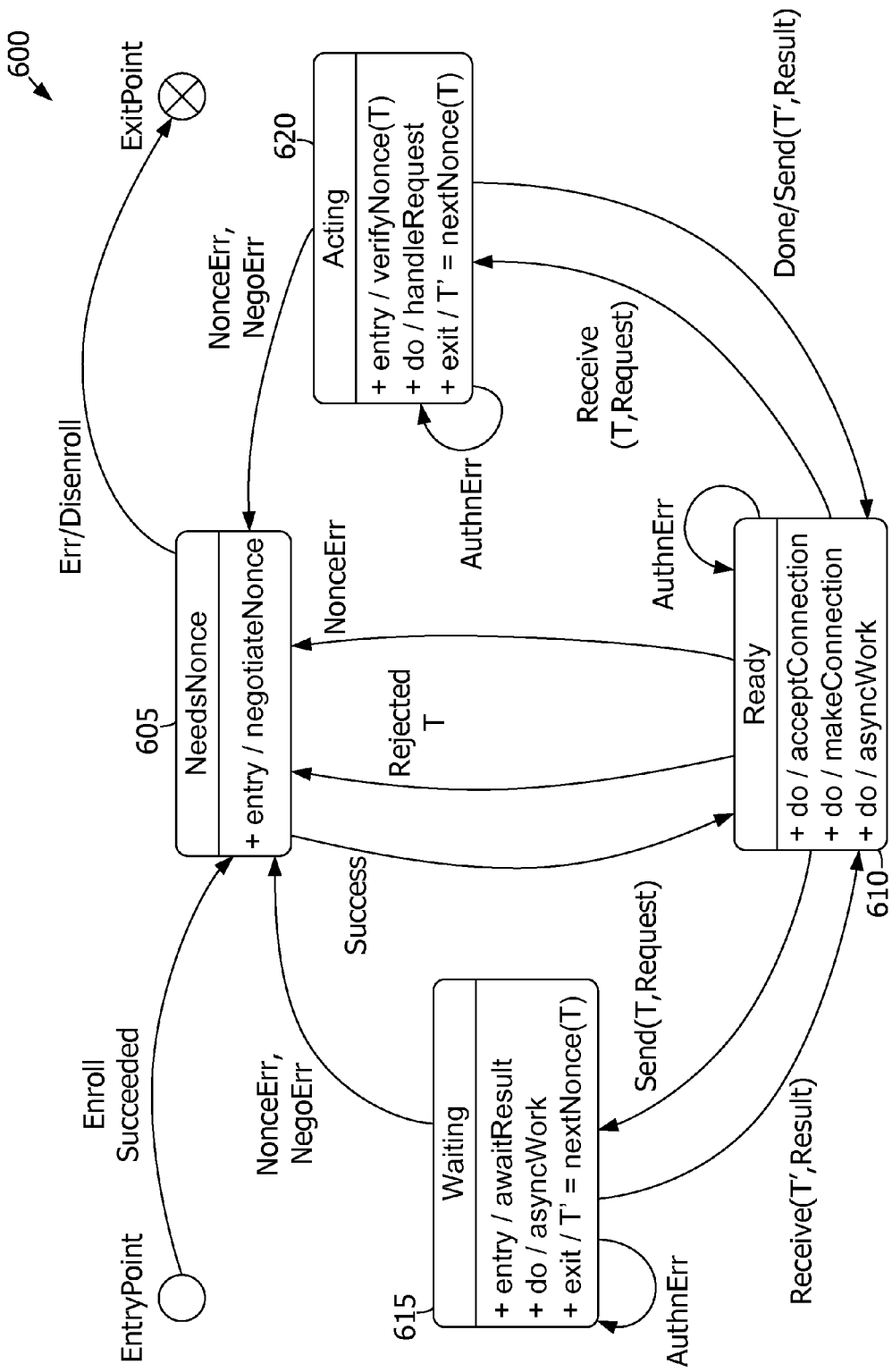
FIG. 6 is an exemplary substate diagram associated with the AssetEnrolled state shown in FIGS. 4 and 5.

FIG. 6 is an exemplary substate diagram 600 associated with AssetEnrolled state 410 (shown in FIGS. 4 and 5). In exemplary embodiments, the manager and a computational asset enter AssetEnrolled state 410 upon determining that the computational asset is successfully enrolled with the manager. While in AssetEnrolled state 410, messages between the manager and the computational asset may be authenticated by the respective authenticator values. In one embodiment, messages may be transmitted within a mutually authenticated Secure Sockets Layer (SSL)/Transport Layer Security (TLS) connection using the manager and computational asset authenticator values as the SSL/TLS certificates. In another embodiment, messages may be digitally signed and such signatures validated using the public key corresponding to the sender's authenticator known to the receiver. The manager and/or the computational asset may generate an authentication error (AuthnErr) in response to messages that fail authentication verification. Such errors cause the The manager or computational asset to ignore the message and remain in the Ready 610 substate of state 410 of diagram 600.

Entering AssetEnrolled state 410, the manager and the computational asset advance to a NeedsNonce substate 605. Upon entering NeedsNonce substate 605, the manager and the computational asset each execute a negotiateNonce function to collectively determine an expected transaction nonce T associated with the computational asset and the manager. In exemplary embodiments, the expected transaction nonce is negotiated by the computational asset and the manager using a key establishment (KE) protocol, such as Ephemeral Diffie-Hellman (EDH) or SIGMA. In another embodiment, the transaction nonce can be generated by the management device or computational asset and sent to the other party.

In exemplary embodiments, the manager and/or the computational asset generate a random value (e.g., using RNG 118, shown in FIG. 1). The expected transaction nonce is negotiated based on the random value generated by the manager, the random value generated by the computational asset, the management authenticator value associated with the manager, the computational asset authenticator value associated with the computational asset, an address (e.g., a network address) associated with manager device 320, an address (e.g., a network address) associated with the computational asset, and/or a sequence number Exemplary pseudo-code associated with the negotiateNonce function executed by the manager is shown in Listing 1 below.

Listing 1

```
if enrollmentTable[assetCert].assetNonce == null {
    b = random( )
    T = KE(b, assetAddr, assetCert)
    enrollmentTable[assetCert].assetNonce = T
} else {
    T = enrollmentTable[assetCert].assetNonce
}
```

Exemplary pseudo-code associated with the negotiateNonce function executed by a computational asset (e.g., VM 235, shown in FIG. 2) is shown in Listing 2 below.

---
Listing 2
---
```
if credentialTable[mgrCert].mgrNonce == null {
    a = random( )
    T = KE(a, mgrAddr, mgrCert)
    credentialTable[mgrCera].mgrNonce = T
} else {
    T = credentialTable[mgrCer].mgrNonce
}
```
---

Figure 7:
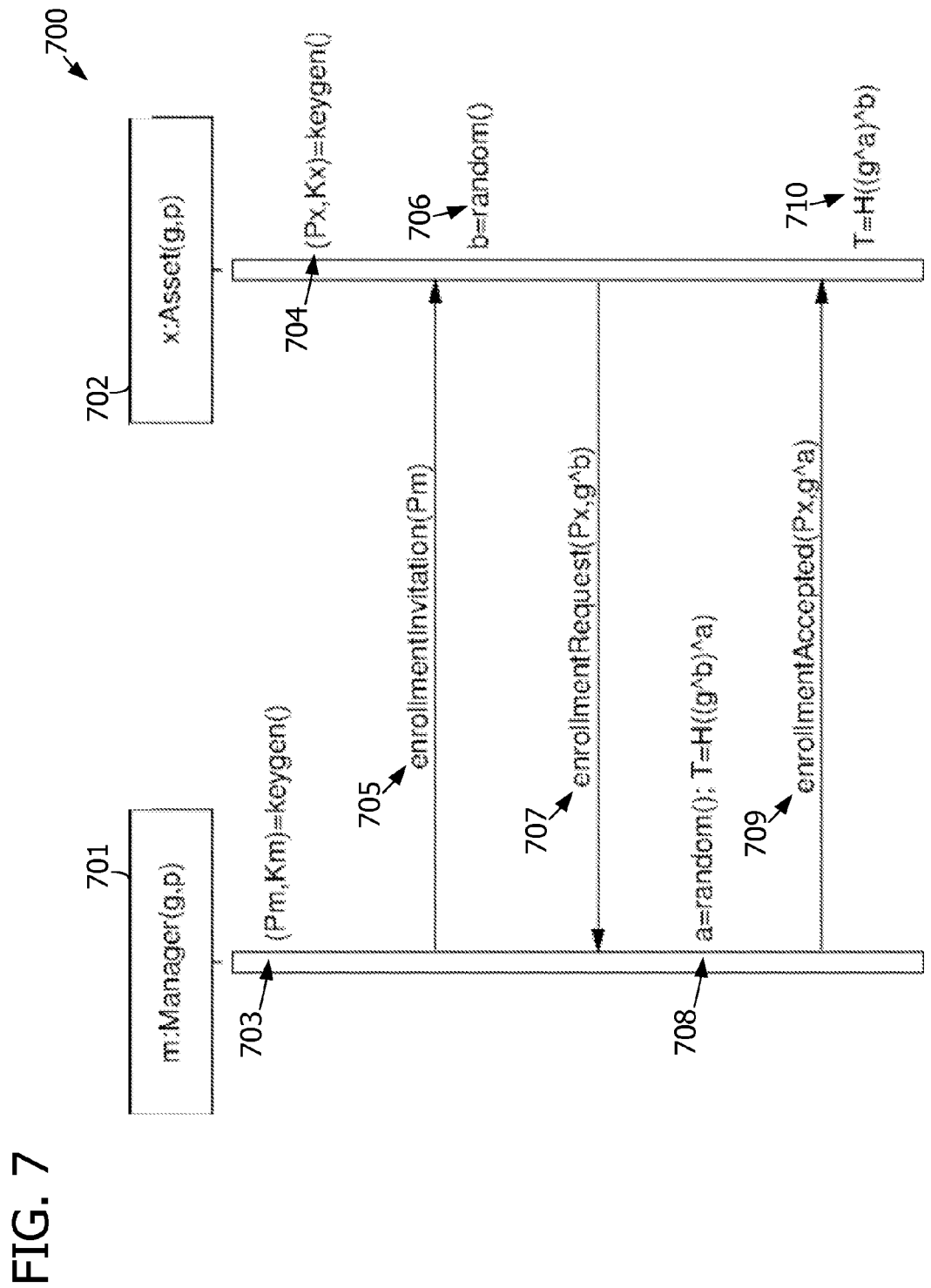
FIG. 7 is an exemplary message sequence for the key establishment (KE) algorithm referenced in Listings 1 and 2.

FIG. 7 is an exemplary message sequence 700 for the key establishment (KE) algorithm referenced in Listings 1 and 2. In exemplary embodiments, sequence 700 uses Ephemeral-Diffie Hellman (EDH), but other key establishment algorithms like SIGMA are contemplated. Messages in sequence 700 are exchanged between a manager 701 and a computational asset 702 across an integrity protected SSL/TLS communication channel using the previously described authenticator values as certificate parameters to SSL/TLS. The management device 701 and computational asset 702 share EDH parameters: generator g and p (e.g. values from RFC3526). All exponentiation calculations g^x shown are calculated modulo p.

Both the management device 701 and computational asset 702 begin the key establishment sequence 700 by generating authenticators (mgrCert) Pm at 703 and Px (assetCert) at 704 and the corresponding private keys Km and Kx. The management device 701 invites the computational asset 702 to enroll by sending its authenticator Pm in an enrollment invitation at 705. The computational asset replies with an enrollmentRequest at 707 that includes a value (g^b) built from a random value 'b' from 706 known only to the computational asset 702. The enrollmentRequest at 707 includes the computational asset's authenticator Px from 704. Upon receiving the enrollmentRequest, the management device calculates the initial nonce T at 708 as value H((g^b)^a) from a random value 'a' known only to the management device. The management device then sends (g^a) back to computational asset 702 in an enrollmentAccepted at 709 whereby computational asset 702 may calculate T as value H((g^a)^b) at 710 since ((g^b)^a mod p) equals ((g^a)^b mod p).

In exemplary embodiments, the communication channel of diagram 700 is not mutually authenticated as the authenticators (certificates) of the management device 701 and computational asset 702 are exchanged as shown at messages 705 and 707.

In Listings 1 and 2, assetCert is the computational asset authenticator value (e.g., an X.509 certificate), mgrCert is the manager authenticator value, KE is the key exchange sequence 700 performed by management device 701 and the computational asset 702, mgrAddr is an address associated with the manager, assetAddr is an address associated with the computational asset, and assetNonce and mgrNonce both refer to table columns that store the expected transaction nonce at the manager and computational asset, respectively.

If an error or disenrollment occurs during nonce negotiation, the manager and the computational asset exit AssetEnrolled state 410. The manager advances to Unmanaged state 420, and the computational asset advances to RectifyDisenrollment state 515, as described above.

If the transaction nonce is successfully negotiated by negotiateNonce, the manager and the computational asset advance to a Ready substate 610. While in Ready substate 610, both the manager and the computational asset may perform asynchronous work (asyncWork) that does not interrupt the state transitions described herein. For example, if the computational asset is a VM 235, the VM may execute one or more hosted software applications (e.g., distributed computing applications and/or web services) while in Ready substate 610. Further, either the manager or the computational asset can accept a message from the other using a Receive function, and either can initiate a transaction by sending a request message to the other using a Send function. Transaction requests transmitted using such connections include a transaction nonce, such as the expected transaction nonce T that resulted from KE earlier and, optionally, the authenticator value associated with the sender of the transaction request. The asset.AssetEnrolled.Send transition triggers execution of the manager.AssetEnrolled.Receive transition, and the manager.AssetEnrolled.Send transition triggers execution of the asset.AssetEnrolled.Receive transition.

The entity that transmits a transaction request (the sender) enters a Waiting substate 615, and the entity that receives the request (the receiver) enters an Acting substate 620.. Upon entering Waiting substate 615 the sender prepares to await and receive the result of the request by executing awaitResult. The sender may continue to perform asynchronous work (asyncWork) while waiting for a response from the receiver.

Upon entering Acting substate 620, the receiver executes a verifyNonce function to verify the sender's knowledge of the transaction nonce. Exemplary pseudo-code associated with the verifyNonce function executed by the manager is shown in Listing 3 below.

---
Listing 3
---
T == enrollmentTable[assetCert].assetNonce

---

Exemplary pseudo-code associated with the verifyNonce function executed by the computational asset is shown in Listing 4 below.

---
Listing 4
---
T == credentialTable[mgrCert].mgrNonce

---

In an alternative embodiment, the receiver may validate the nonce without the nonce's transmission. For example, the sender may generates a random value r and transmit H1=H(r, T) along with r (instead of transmitting T). The receiver calculates H2=H(r, T) and compares H1 to H2. If H1 and H2 are equal, the validation is successful.

Figure 8:
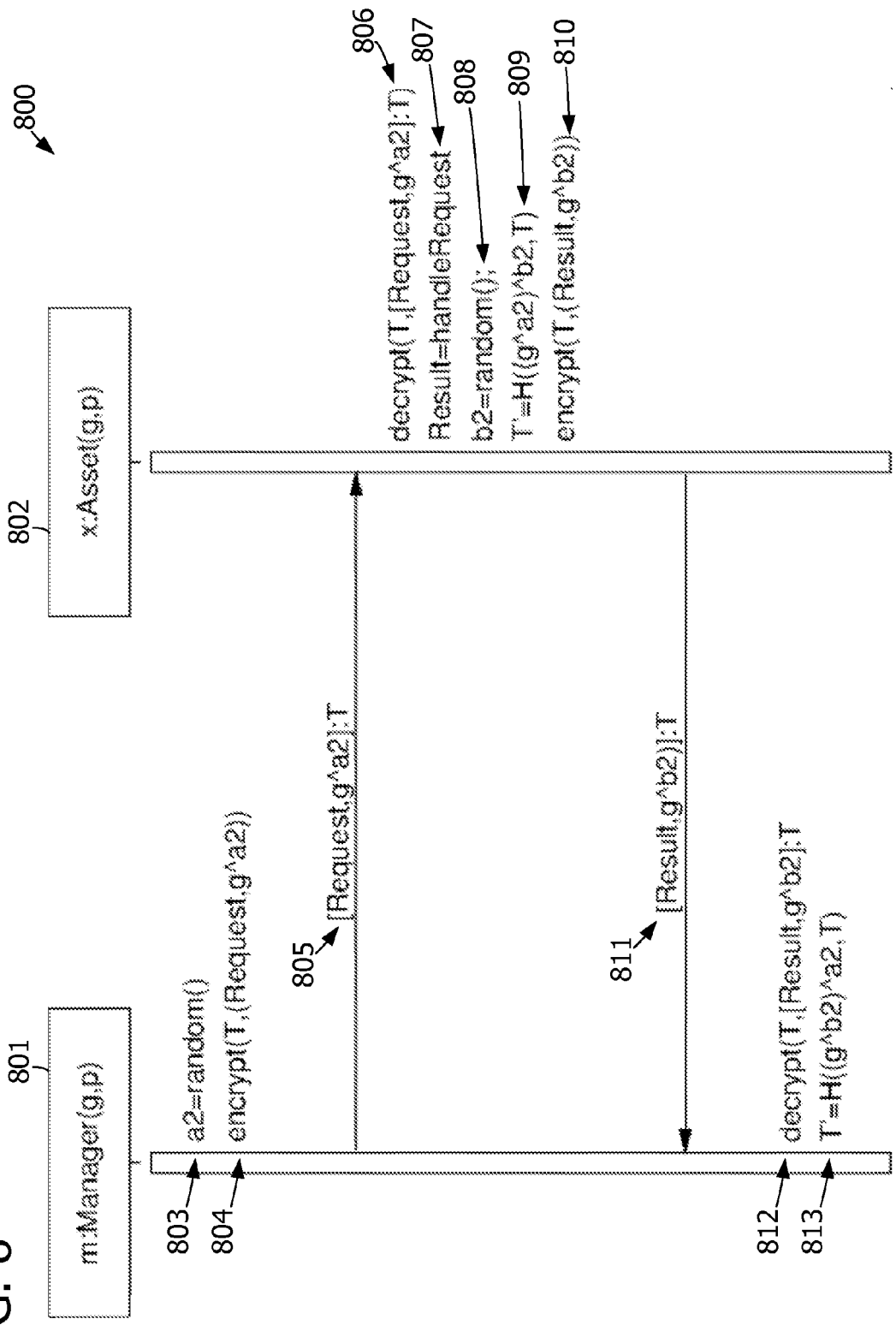
FIG. 8 is an alternative message sequence of nonce verification that allows a receiver to validate a sender's knowledge of a transaction nonce without requiring the sender to transmit the nonce with the request.

FIG. 8 is an alternative message sequence 800 of nonce verification that allows the receiver at acting substate 620 (shown in FIG. 6) to validate the sender's knowledge of the nonce without requiring the sender to transmit the nonce with the request. Instead the sender encrypts the request using T as the encryption key. As shown in FIG. 8, a manager 801 initiates a transaction with a computational asset 802. At 804 the manager 801 encrypts the request with the current transaction nonce T expected to be known by computational asset 802. The request is transmitted over a mutually authenticated TLS/SSL connection at 805. Mutual authentication is achieved using the authenticators (certificates) previously described. Upon reception of the request at 806, the computational asset verifies the nonce (ref. verifyNonce at 620) by decrypting the request using its version of the current transaction nonce T—which must be identical to the nonce T at

804 otherwise the decryption will fail in which case the computational asset will transition according to NonceErr at 620.

When the verification of the received transaction nonce succeeds at 806, the computational asset 802 handles the request at 807 (ref. handleRequest in 620) and generates the result (ref. Result in 620). For example, the receiver may retrieve and/or modify data as requested by the sender. Operations that rely on proper synchronization between the sender's knowledge of the state of the receiver are now assured as the sender and receiver are synchronized with the value of the nonce.

The receiver also executes nextNonce logic to generate a new expected transaction nonce T'. Exemplary pseudo-code associated with the nextNonce function executed by manager 320 is shown in Listing 5 below.

Listing 5 b = random( )
T' = H(b, T)

Exemplary pseudo-code associated with the nextNonce function executed by the computational asset is shown in Listing 6 below.

Listing 6 a = random( )
T' = H(a, T)

In Listings 5 and 6, H is a hash function, such as the SHA-1 cryptographic hash function. As shown in Listings 5 and 6, the new expected transaction nonce T' may be determined based on a random value and a previously negotiated transaction nonce.

FIG. 8 includes an alternate embodiment of nextNonce expected transaction nonce T' generation. FIG. 8 shows T' computed by nextNonce using the key establishment algorithm Ephemeral Diffie-Hellman (EDH). Both the manager 801 and the computational asset 802 share EDH parameters g and p (e.g. values from RFC3526), and use an exponentiation operation ^ modulo p (i.e. g^x is computed modulo p). At 803, manager 801 generates a random value 'a2' using RNG 118. Manager 801 sends value g^a2 in the request at 805. While encryption of the request by T proves manager's 801 knowledge of expected transaction nonce T, the value g^a2 will contribute to the next nonce value T' as will be explained. The computational asset 802 receives g^a2 along with the request and decrypts the value with the current nonce T at 806. This proves knowledge of T by manager 801 to computational asset 802. Before sending result 811, computational asset 802 generates a random value 'b2' using RNG 118 and then computes the nextNonce T' at 809 based on cryptographic hash H, value (g^b2)^a2, and the previous nonce T. The value T' is not sent in the result. Instead the result is encrypted with current nonce T at 810 as proof of knowledge of T by computational asset 802 to manager 801. The result includes value g^b2. At 812, manager 801 receives and decrypts the result using T. This proves knowledge of T by computational asset 802. Manager 801 then independently calculates T' using cryptographic hash H, value (g^b2)^a2, and the previous nonce T at 813. Since (g^b2)^a2 mod p=(g^a2)^b2 mod p, both manager 801 at 813 and the computational asset 802 at 809 now share knowledge of next expected nonce T'. Either management device 801 or computational asset 802 can now send a request encrypted with T' as proof of that knowledge.

In some embodiments, the transaction request includes a sequence number (N). In such embodiments, the receiver may validate the transaction request at least in part by determining whether the sequence number N of the transaction request is equal to an expected sequence number that is associated with the authenticator value of the sender and/or with the expected transaction nonce. If the received sequence number is not equal to the expected sequence number, an error condition may be recognized, and the receiver and the sender may proceed to NeedsNonce substate 605 and/or may exit AssetEnrolled state 410. In some embodiments, knowledge of the expected nonce value can be dependent on knowledge of the correct current sequence number by generating the next expected nonce value using N. For example: T'=H((g^a)^b, T, N).

The receiver may provide the new expected transaction nonce T' to the sender. For example, the receiver may include T' in the transaction result transmitted to the sender. Alternatively, the receiver may transmit T' separately. Alternative embodiments may reverse the nonce generation responsibilities of the sender and receiver whereby the sender generates the new expected transaction nonce. Alternatively, the sender and receiver may negotiate T' as shown in FIG. 8 by including in the transaction request and result the parameters (e.g. g^a at 805 and g^b at 811) whereby use of a key establishment algorithm like EDH can compute the new nonce as shown at 809 and 813. Both the sender and the receiver store T' for use in subsequent verification of a received transaction request and return to Ready substate 610, described above.

When the receiver's verification of the sender's knowledge of the expected transaction nonce fails (e.g., the request cannot be decrypted using T as at 806), a nonce error (NonceErr) occurs, and both the sender and the receiver return to NeedsNonce substate 605. The sender and the receiver may also return to NeedsNonce substate 605 if a failure occurs during nextNonce generation or before the value is returned to the sender, and/or if a negotiation error (NegoErr) occurs.

In exemplary embodiments, when the manager and the computational asset advance to NeedsNonce substate 605 due to a NonceErr, the manager advances to Unmanaged state 420, and the computational asset advances to RectifyDisenrollment state 515. The manager adds the computational asset to the inventory of unenrolled assets and proceeds to Invite state 415, re-executing the invitation process. The computational asset advances to AwaitEnrollment state 510 where it generates a new authenticator (e.g. X509 cert) and sends the authenticator by sendEnrollmentRequest. Accordingly, a computational asset that has provided proof of knowledge of a transaction nonce that differs from the expected transaction nonce stored by the manager may be automatically enrolled with the manager using a new computational asset authenticator value and may subsequently receive and/or request transactions using a new negotiated transaction nonce.

Figure 9:
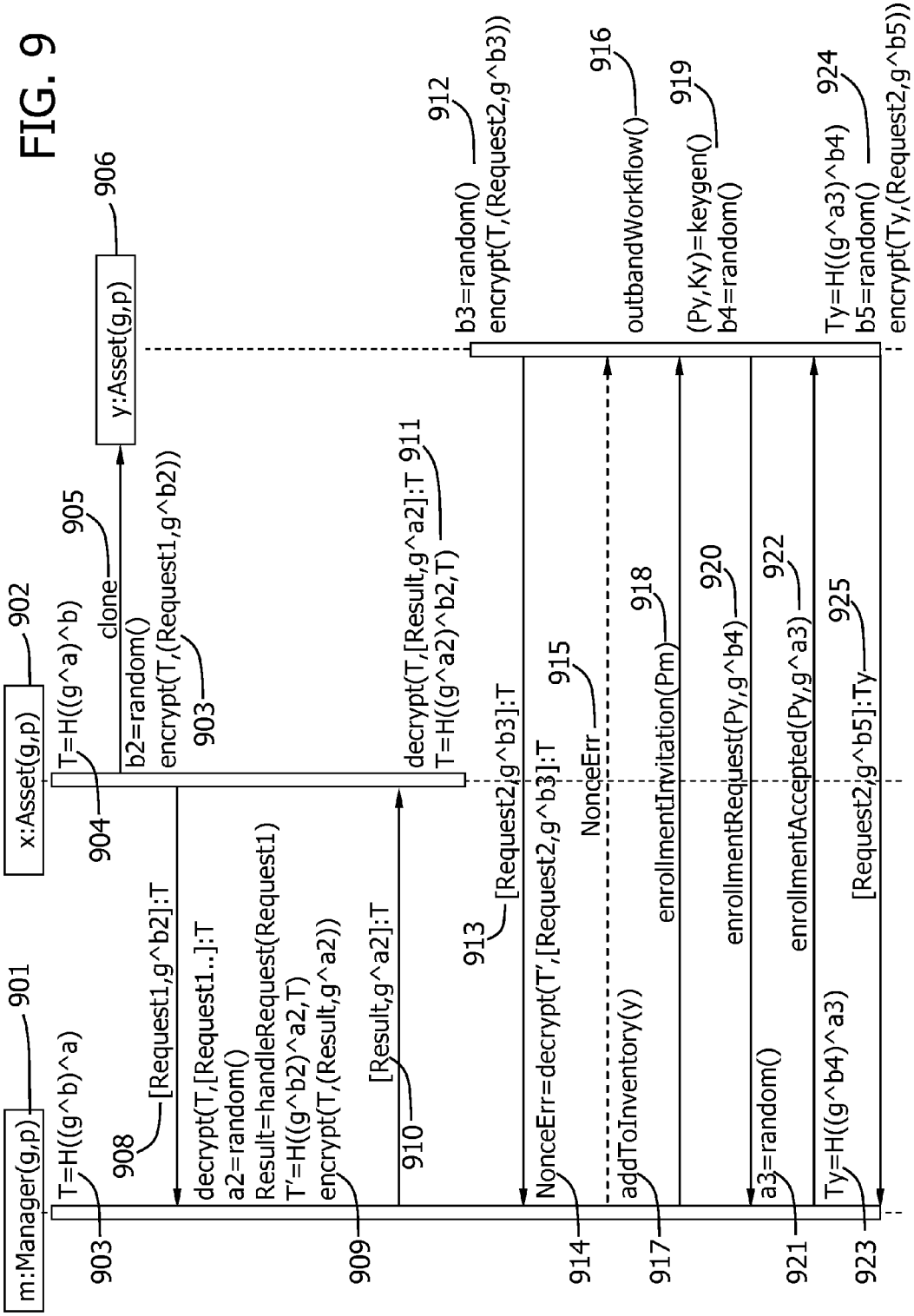
FIG. 9, is an exemplary message sequence diagram demonstrating the handling of a NonceErr due to duplication of a computational asset.

The occurrence of a NonceErr may indicate that a computational asset has been duplicated. FIG. 9 is an exemplary message sequence 900 demonstrating the handling of a NonceErr due to such duplication. As shown in FIG. 9, a manager 901 interacts with a first computational asset 902 and a second computational asset 906. First computational asset 902 (e.g., first VM $235_1$, shown in FIG. 3) is duplicated at 905 after an expected transaction nonce T is negotiated with manager 901, creating second computational asset 906 (e.g., second VM $235_2$, shown in FIG. 3). First computational asset 902 and second computational asset 906 initially have identical state, including, for example, a first authenticator value Px that was previously generated and enrolled (e.g., at 704, shown in FIG. 7). First computational asset 902 and second computational asset 906 transmit a first transaction request at 908 and a second transaction request at 913, respectively, to manager 901. Because first computational asset 902 and second computational asset 906 are clones, the first and second transaction requests both authenticate using the authenticator value Px associated with first asset 902, and both provide proof of knowledge of the same transaction nonce T from 904.

The first transaction request 908 is received by manager 901 prior to receiving the second transaction request at 913. The request is transmitted over a mutually authenticated TLS/SSL connection. Mutual authentication is achieved using the authenticators Pm and Px (certificates) previously described. Manager 901 selects the expected transaction nonce that manager 901 previously associated with the first computational asset's 902 authenticator value, and the first transaction request 908 is successfully verified because the received transaction is decrypted using T at 909 thus proving the sender's (first computational asset 902) knowledge at 907 of a nonce equal to the expected transaction nonce. Upon handling the request, manager 901 calculates a new expected transaction nonce T' at 909 based on the previous expected transaction nonce T and values (g^b2) and 'a2' with first computational asset 902. Manager 901 now associates T' with the first computational asset 902 authenticator value, and sends 'a2' to 902 with the transaction result at 910.

When the second transaction 913 request is received from 906, it was transmitted over a mutually authenticated TLS/SSL connection using the authenticators Pm and Px (certificates) for manager 901 and first computational asset 902 previously described. Second computational asset 906 uses the authenticator Px of first computational asset 902 because second computational asset 906 is a duplicate of first computational asset 902. Manager 901 selects the expected transaction nonce associated with the first computational asset 902's authenticator value. However, the associated nonce has been updated to T' based on the first transaction request 908 and result 910. Request 913 fails to verify—the received transaction does not decrypt using T and thus does not include proof of knowledge of a nonce equal to the expected transaction nonce T'. In this instance, the verification fails because second computational asset 906 has proved knowledge of the expected transaction nonce T that was previously associated with the first computational asset 902's authenticator value, rather than of the expected transaction nonce T' that is currently associated with the 902's authenticator value.

Manager 901 sends a NonceErr at 915 and adds second computational asset 906 to manager's 901 inventory of unenrolled assets at 917. Upon receiving the NonceErr, second computational asset 906 updates its internal state to disenrolled and enters RectifyDisenrollment state 515. Manager 901 sends an enrollment invitation at 918 to second computational asset 906. Second computational asset 906 prepares to enroll by generating new authenticator Py and private key Ky along with new random value 'b4' that will contribute to its first nonce value Ty at 923. Second computational asset 906 sends enrollmentRequest including authenticator Py and value (g^b4) at 920 over a non-mutually authenticated channel. Manager 901 generates new random value 'a3' at 921 and returns (g^a3) in enrollmentAccepted at 922. Manager 901 generates next nonce value Ty with second computational asset 901 by calculating Ty=H((g^b4)^a3) at 923 while second computational asset 906 calculates the same value Ty=H((g^a3)^b4) at 924. At this point second computational asset 906 is enrolled with manager 901 using a new authenticator Py different from the authenticator Px originally copied from first computational asset 902. Second computational asset 906 also shares a new private nonce value Ty with manager 901.

Second computational asset 906 can now resend Request2 (after its initial failure at 913). Second computational asset 906 generates new random value 'b5' at 924 that will contribute to next value Ty' and resends Request2 at 925 to manager 901 now encrypted with Ty thus proving second computational asset's knowledge of Ty. Manager 901 decrypts using Ty thus proving management device's knowledge of Ty. Further interactions between second computational asset 901 and manager 901 may now behave as described with reference to FIG. 8.

Manager 901 may send or receive requests from any quantity of computational assets like first computational asset 902 and second computational asset 906. In a further exemplary scenario based on the diagram 900 above, second computational asset 906 (e.g. VM $235_2$) is duplicated to create a third computational asset (e.g. VM $235_3$) after manager 901 and second computational asset 906 have negotiated the expected transaction nonce Ty. Third computational asset VM $235_3$ transmits a transaction request to manager 901 that uses the same authenticator value Py as 906 and is encrypted with same transaction nonce Ty. If manager 901 can decrypt the request, then second computational asset 906 (VM $235_2$) has not submitted a transaction request to manager 901, which would have triggered the creation of a new expected transaction nonce. When manager 901 transmits a transaction result to third computational asset VM $235_3$ based on the transaction request, Ty will be replaced by Ty' with VM $235_3$ and computational asset 906 will eventually receive a NonceErr upon re-using Ty.

While specific implementations are described herein, it is contemplated that other implementations may be operable to achieve the same results. For example, authentication may be implemented using X.509-based asymmetric cryptography. In addition, or alternatively, GNU Privacy Guard (GPG) public keys may be used by verifying that GPG keys associated with a manager and a computational asset are in the management device's and the computational asset's webs of trust. Kerberos and/or shared-secret schemes may be used for authentication when both the manager and the computational asset are registered with the key distribution system before interacting with each other. As another alternative, secret authenticators, such as shared passphrases, may be distributed out-of-band to the computational assets.

In exemplary embodiments, the interaction between the manager and computational asset take place over a confidential and mutually authenticated TLS (SSLv3.1) channel established using X509 certificates as authenticators. In this case the non-authenticating key establishment algorithm Ephemeral Diffie-Hellman (EDH) is used to negotiate both the initial and subsequent expected transaction nonce values. Alternatively, if the interaction between a computational asset and a manager takes place over a non-authenticating channel, authenticating key establishment algorithms such as Internet Key Exchange (IKE), the Station-to-Station (STS) protocol, SIGMA, and/or the Oakley Key Determination Protocol may be used to negotiate the initial nonce, while a non-authenticating algorithm like EDH may be used to negotiate subsequence nonce values. Further, if there is a confidential channel and no requirement that either the sender or receiver be unable to predict or influence the initial nonce value, then either side may set the initial nonce to a random value and transmit it to the other.

In exemplary embodiments, transaction nonces after the initial transaction nonce are generated and made dependent upon the initial nonce by using an SHA-1 hash function. In addition, or alternatively, any hash algorithm may be used. Further, instead of generating the next nonce by the receiver, the sender and receiver collaboratively negotiate a subsequent transaction nonce using the non-authenticating EDH algorithm in combination with the SHA-1 hash function. Negotiating subsequent transaction nonces facilitates confidential and unpredictable nonce values when the communication channel between the manager and the computational asset is not confidential and/or when it is desired that neither the sender nor receiver be able to predict or determine the next transaction nonce. The overhead of the nonce negotiation messages may be attached to request-result messages such that no additional message traffic is generated.

In exemplary embodiments, the communication channel between the manager and computational asset is susceptible to tampering, the transaction nonce T provided to the AssetEnrolled.Acting substate is bound to the request by encrypting the request using T. Successful decryption proves shared knowledge of T by the sender and receiver. An alternative embodiment may bind T to the request by computing a message authentication code M=MAC(T, Request) and transmitting M in the request.

The manager and computational asset each can verify that the other is a member of a trusted enterprise by verifying that authenticator values are certificates issued by a trusted certification authority (CA) and by verifying the authenticator values upon reception.

Further, while exemplary embodiments are operable without predetermined, static identifiers associated with computational assets, a management application may optionally implement an identifier-issuing service using the asset identity concepts to distinguish computational assets. An exemplary asset identifier is the triplet <managerAddress, enrollmentTableIndex, assetAuthenticator>. Any computational asset located using this identifier may be expected to either be (state-wise) the same as when the identifier was issued or to be a descendent. Under an assumption that computational assets with identical states are identical, such a scheme provides the same guarantees as a conventional globally unique identifier while being able to distinguish computational asset copies.

The methods described may be performed by computing devices, such as management device 320 and/or hosts 305 in cluster system 300 (shown in FIG. 3). The computing devices communicate with each other through an exchange of messages and/or stored data. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

Exemplary Operating Environment

The operations described herein may be performed by a computer or computing device. A computer or computing device may include one or more processors or processing units, system memory, and some form of computer readable media. Exemplary computer readable media include flash memory drives, digital versatile discs (DVDs), compact discs (CDs), floppy disks, and tape cassettes. By way of example and not limitation, computer readable media comprise computer-readable storage media and communication media. Computer-readable storage media store information such as computer readable instructions, data structures, program modules, or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the disclosure are operative with numerous other general purpose or special purpose computing system environments or configurations. Examples of well known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The operations illustrated and described herein may be implemented as software instructions encoded on a computer-readable medium, in hardware programmed or designed to perform the operations, or both. For example, aspects of the disclosure may be implemented as a system on a chip.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for communicating with a plurality of virtual machines (VMs) in a computing system, the system comprising:
- a plurality of host computing devices executing a plurality of VMs; and
- a management device coupled in communication with the host computing devices and configured to:
  - negotiate an expected transaction nonce with a first VM of the plurality of VMs, wherein the first VM is enrolled by the management device and associated with a first VM authenticator value;
  - receive a transaction request from a sender VM of the plurality of VMs, wherein the transaction request is associated with the first VM authenticator value and a transaction nonce, wherein the first VM authenticator value and the transaction nonce are used to authenticate the sender VM;
  - upon determining that the transaction nonce associated with the transaction request is equal to the expected transaction nonce, enroll the sender VM as the first VM;
  - receive a second transaction request from a second sender VM of the plurality of VMs, wherein the second transaction request is associated with the first VM authenticator value and a second transaction nonce, wherein the first VM authenticator value and the second transaction nonce are used to authenticate the second sender VM; and
  - upon determining that the second transaction nonce associated with the second transaction request is equal to the expected transaction nonce, enroll the second sender VM as a duplicate of the first VM.

2. The system of claim 1, wherein the management device is configured to enroll the sender VM at least in part by:
- transmitting an enrollment invitation to the sender VM, wherein the enrollment invitation includes a manager authenticator value associated with the management device; and
- receiving an enrollment request from the sender VM, wherein the enrollment request includes the second VM authenticator value that is associated with the sender VM.

3. The system of claim 1, wherein the negotiated transaction nonce is a first negotiated transaction nonce, and the management device is further configured to negotiate a second transaction nonce with the sender VM.

4. The system of claim 3, wherein the transaction request is a first transaction request received from a first sender VM, and the management device is further configured to:
- receive a second transaction request from a second sender VM of the plurality of VMs, wherein the second transaction request is associated with the second VM authenticator value and a transaction nonce;
- when the transaction nonce associated with the second transaction request is equal to the previously negotiated second expected transaction nonce, transmit a transaction result to the second VM based on the second transaction request; and
- when the transaction nonce associated with the second transaction request is not equal to the previously negotiated second expected transaction nonce, enroll the sender VM as a third VM, wherein the third VM is associated with a third VM authenticator value.

5. The system of claim 1, wherein the management device is further configured to:
- generate a random value; and
- negotiate the transaction nonce with the first VM based on the generated random value.

6. The system of claim 5, wherein the management device is further configured to negotiate the transaction nonce with the first VM based further on the first VM authenticator value.

7. The system of claim 5, wherein the management device is further configured to negotiate the transaction nonce with the first VM based further on a manager authenticator value associated with the management device.

8. The system of claim 1, wherein the sender VM is authenticated, and the management device is further configured to negotiate a second expected transaction nonce with the sender VM based on the first expected transaction nonce.

9. A method comprising:
- negotiating an expected transaction nonce with a first VM, wherein the first VM is associated with a first VM authenticator value;
- receiving, by a computing device executing a receiver software application, a transaction request from a sender software application, wherein the transaction request is associated with the first VM authenticator value and a transaction nonce that are used to authenticate the sender software application;
- upon determining that the transaction nonce associated with the transaction request is equal to the expected transaction nonce, enrolling the sender VM as an original VM;
- receiving a second transaction request from a second sender, wherein the second transaction request is associated with the first VM authenticator value and a second transaction nonce, wherein the first VM authenticator value and the second transaction nonce are used to authenticate the second sender VM; and
- upon determining that the second transaction nonce associated with the second transaction request is equal to the expected transaction nonce, enrolling the second sender VM as a duplicate of the original VM.

10. The method of claim 9, wherein the sender software application is a manager software application and the receiver software application is a computational asset managed by the manager software application, the method further comprising, when the transaction nonce associated with the transaction request is not equal to the first expected transaction nonce:
- generating by the computing device a computational asset authenticator value; and
- transmitting by the computing device an enrollment request to the manager software application, wherein the enrollment request is associated with the generated computational asset authenticator value.

11. The method of claim 9, wherein the receiver software application is a manager software application, the sender software application is a computational asset managed by the manager software application, and the computational asset value is a first computational asset value, the method further comprising, when the transaction nonce associated with the transaction request is not equal to the first expected transaction nonce, enrolling by the manager software application the computational asset, wherein the computational asset is associated with a second computational asset authenticator value different from the first computational asset authenticator value.

12. The method of claim 11, further comprising, when the transaction nonce associated with the transaction request is not equal to the first expected transaction nonce, determining by the computing device a second expected transaction nonce associated with the first computational asset authenticator value.

13. The method of claim 11, wherein the transaction request includes a sequence number, the method further comprising:
associating with the authenticator value an expected sequence number; and
validating the transaction request at least in part by determining whether the sequence number of the transaction request is equal to the expected sequence number.

14. The method of claim 9, wherein determining the expected transaction nonce comprises negotiating a transaction nonce based on a first authenticator value associated with the receiver software application and a second authenticator value associated with the sender software application.

15. The method of claim 9, wherein determining the first expected transaction nonce comprises negotiating a transaction nonce between the receiver software application and the sender software application based on a random value generated by the receiver software application.

16. One or more non-transitory computer-readable storage media having computer-executable components comprising:
an enrollment component that when executed causes at least one processor to:
transmit an enrollment invitation from a manager software application to a first computational asset of a plurality of computational assets, wherein the enrollment invitation includes a manager authenticator value associated with the manager software application; and
enroll the first computational asset based on receiving an enrollment request from the first computational asset, wherein the first computational asset is associated with a computational asset authenticator value; and
a transaction component that when executed causes at least one processor to:
determine an expected transaction nonce associated with the first computational asset;
receive a transaction request from a sender computational asset, wherein the transaction request is associated with the computational asset authenticator value and a transaction nonce;
upon determining that the transaction nonce associated with the transaction request is equal to the expected transaction nonce, identify the sender computational asset as the first computational asset;
receiving a second transaction request from a second sender computational asset, wherein the second transaction request is associated with the computational asset authenticator value and a second transaction nonce; and
upon determining that the second transaction nonce associated with the second transaction request is equal to the expected transaction nonce, enrolling the second sender computational asset as a duplicate of the first computational asset.

17. The non-transitory computer-readable storage media of claim 16, wherein when the transaction nonce associated with the transaction request is not equal to the expected transaction nonce, the enrollment component causes at least one processor to transmit an enrollment invitation to the sender computational asset.

18. The non-transitory computer-readable storage media of claim 16, wherein the transaction component causes at least one processor to determine the expected transaction nonce at least in part by negotiating a transaction nonce with the first computational asset based on the computational asset authenticator value and the manager authenticator value.

19. The non-transitory computer-readable storage media of claim 18, wherein the transaction component causes at least one processor to negotiate the transaction nonce with the first computational asset based further on a first random value generated by the transaction component and a second random value generated by the first computational asset.

20. The system of claim 1, wherein the sender VM was duplicated from the first VM after the first VM was enrolled by the management device and associated with the first VM authenticator value and prior to the first VM being associated with the transaction nonce.

* * * * *